United States Patent [19]
Takahashi

[11] Patent Number: 5,450,270
[45] Date of Patent: Sep. 12, 1995

[54] SOLENOID VALVE CONTROL SYSTEM

[75] Inventor: Seiichi Takahashi, Shizuoka, Japan

[73] Assignee: Jatco Corporation, Fuji, Japan

[21] Appl. No.: 988,318

[22] Filed: Dec. 9, 1992

[51] Int. Cl.$^6$ ............................................. H01H 47/02
[52] U.S. Cl. ...................................................... 361/154
[58] Field of Search ................................. 361/152–155

[56]        References Cited
        U.S. PATENT DOCUMENTS

| | | |
|---|---|---|
| 3,946,285 | 3/1976 | Beery et al. ............................ 361/153 |
| 4,667,117 | 5/1987 | Nebgen et al. ......................... 307/154 |
| 4,745,514 | 5/1988 | Takeshima et al. ................... 361/154 |
| 4,823,825 | 4/1989 | Buechl ................................. 361/152 X |
| 4,978,865 | 12/1990 | Hartmann et al. ................. 361/152 X |
| 5,182,517 | 1/1993 | Thelen et al. ..................... 361/152 X |

OTHER PUBLICATIONS

"Nissan Service Manual, No. 578", pp. C–27–C–29, (1987).

*Primary Examiner*—A. D. Pellinen
*Assistant Examiner*—Fritz M. Fleming
*Attorney, Agent, or Firm*—Foley & Lardner

[57]            ABSTRACT

A solenoid valve control system controlling a solenoid valve which changes a solenoid valve state between an opened state and a closed state by applying pulsed electric power thereto. The solenoid valve control system includes an ammeter for detecting a current value applied to the solenoid and a control device for controlling electric power supplied to the solenoid. The control device has a duty control section which controls an ON-OFF ratio of pulsed electric power repeatingly applied to the solenoid and a correcting section which corrects an output from the duty control section according to the current value detected by the ammeter. Therefore, the line pressure is kept at a precise target value.

4 Claims, 5 Drawing Sheets

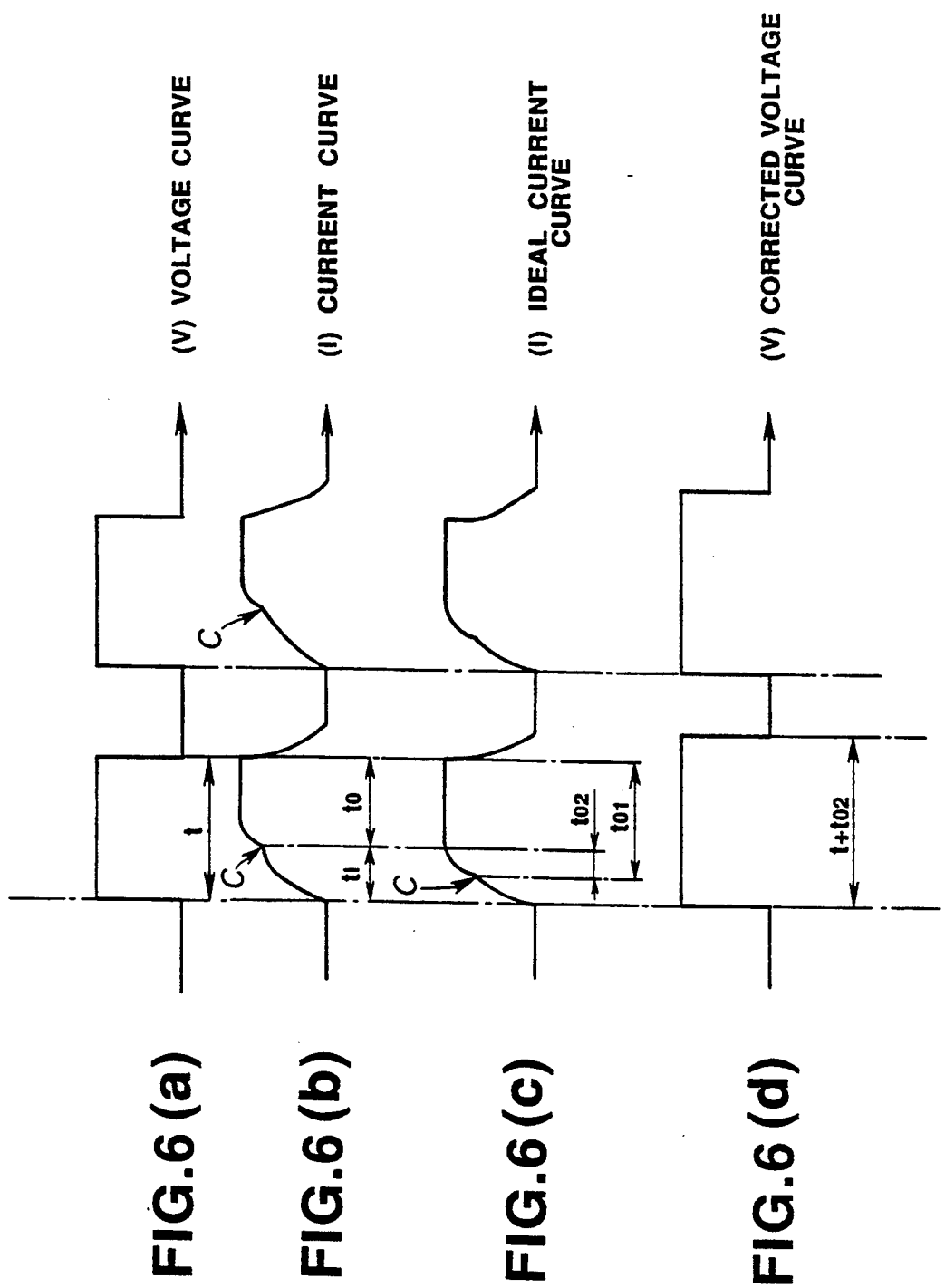

SOLENOID VALVE CONTROL SYSTEM

BACKGROUND OF THE INVENTION

1. Field of the Invention

The present invention relates to improvements in a solenoid valve control system, and more particularly to a correcting control of a signal for driving a solenoid which control is carried out such that the solenoid is constantly operated in various conditions.

2. Description of the Prior Art

A publication "Nissan Service Manual, No. 578, Pages C-27 to C-29" discloses a solenoid valve control system with a correcting control device, wherein the correcting control device corrects a line pressure according to a hydraulic temperature while the line pressure is controlled by a basic control device according to a throttle opening and a vehicle speed. More particularly, such a solenoid valve control system previously memorizes an optimum line pressure corresponding to the throttle opening and the vehicle speed, and controls a duty ratio of an electric power applied to a line pressure control solenoid valve so as to adjust the line pressure to a target value.

However, such a conventional solenoid valve control system has had drawbacks, such that an operating speed of the solenoid in such conventional solenoid system is dispersed individually. That is to say, since the resistances of the solenoids are not constant individually or varied according to ambient temperature due to its temperature property, the electromagnetic force takes various value thereby. Such a dispersion of the electromagnetic forces invites a dispersion of a moving speed of a solenoid valve. Therefore, the dispersion or variation of the resistance of the solenoid causes a dispersion of the operation speed of the solenoid. In particular, in this control system, the valve body of the solenoid moves by each pulsed ON-OFF signal to close or open the valve when the solenoid receives repeating ON-OFF signals as in the duty ratio control. Accordingly, if the moving speed of the solenoid valve is not constant, the time period for setting the valve in a closed or opened condition becomes-inconstant. Therefore, even if the same signal having the same voltage and duty ratio is applied to the solenoid, the ratio between the opening and the closing periods of the valve is changed corresponding to the resistance of the solenoid coil and the hydraulic temperature. This prevents the line pressure from being properly controlled.

SUMMARY OF THE INVENTION

It is an object of the present invention to provide a solenoid valve control system which properly and accurately controls a solenoid valve even if a valve moving speed is changed due to the dispersion of a solenoid resistance and a hydraulic temperature.

To achieve the foregoing object and in accordance with the purpose of the invention, a solenoid valve control system comprises a solenoid changing a solenoid valve state between an opened state and a closed state by applying an electric power having a predetermined voltage value and a pulsed electric current thereto; means for detecting the value of the pulsed electric current applied to said solenoid; and means for controlling the pulsed electric power applied to said solenoid. The controlling means includes a duty control section controlling an ON-OFF ratio of pulsed electric power repeatedly applied to said solenoid, and a correcting section which corrects an output from the duty control section according to the current value detected by said detecting means, the correcting section detecting a time period from a start of a pulsed electric current of the electric power to a first moment when a rate of the change of the current is temporally changed from plus to minus and correcting the ON-OFF ratio of the predetermined pulsed electric power such that the time period from the first moment to a second moment of an end of the pulsed electric current is kept at a predetermined value.

With this solenoid valve control system, even if the valve moving time becomes different from the previously determined ideal time due to the dispersion of solenoid resistance and hydraulic temperature, the valve closing time is kept at constant. Therefore, the line pressure is controlled at a precise value.

BRIEF DESCRIPTION OF THE DRAWINGS

FIGS. 6(a) to 6(d) are wave form charts of voltage and current applied to the line pressure solenoid.

DETAILED DESCRIPTION OF THE INVENTION

Figure 1:
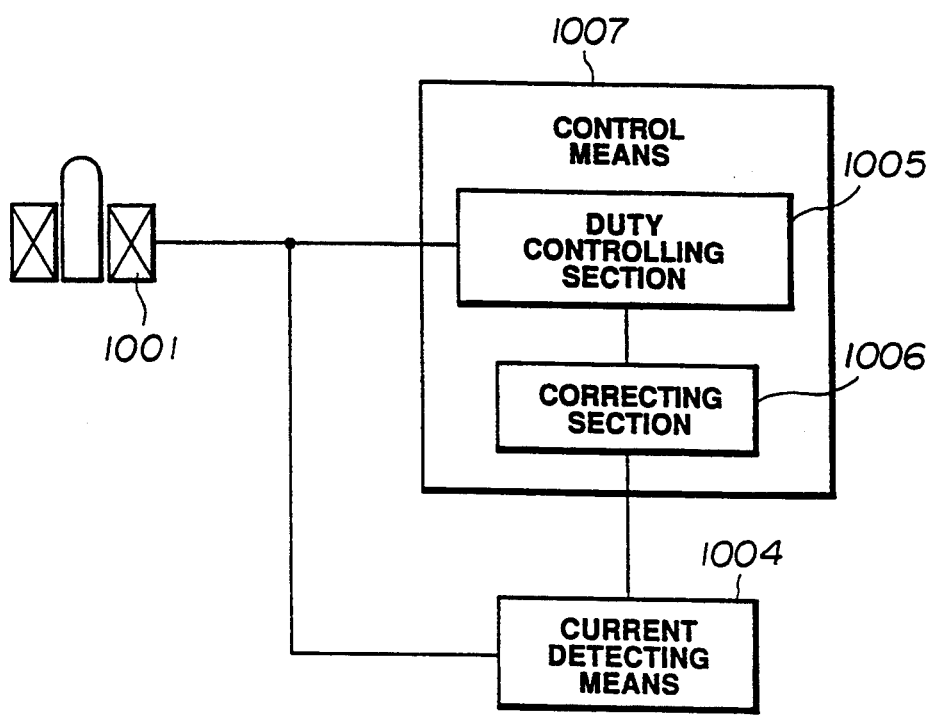
FIG. 1 is a schematic block diagram of a solenoid valve control system according to the present invention.

As shown in FIG. 1, a solenoid valve control system according to the present invention comprises a solenoid 1001 changing a solenoid valve state between an opened state and a closed state by applying an electric power thereto. A current value detecting means 1004 detects a current value applied to the solenoid. A controlling means 1007 controls pulsed electric power applied to the solenoid. The controlling means includes a duty controlling section 1005 which controls an ON-OFF ratio of pulsed electric power repeatingly applied to the solenoid. A correcting section 1006 corrects an output from the duty controlling section according to the current value detected by the current detecting means.

Figure 2:
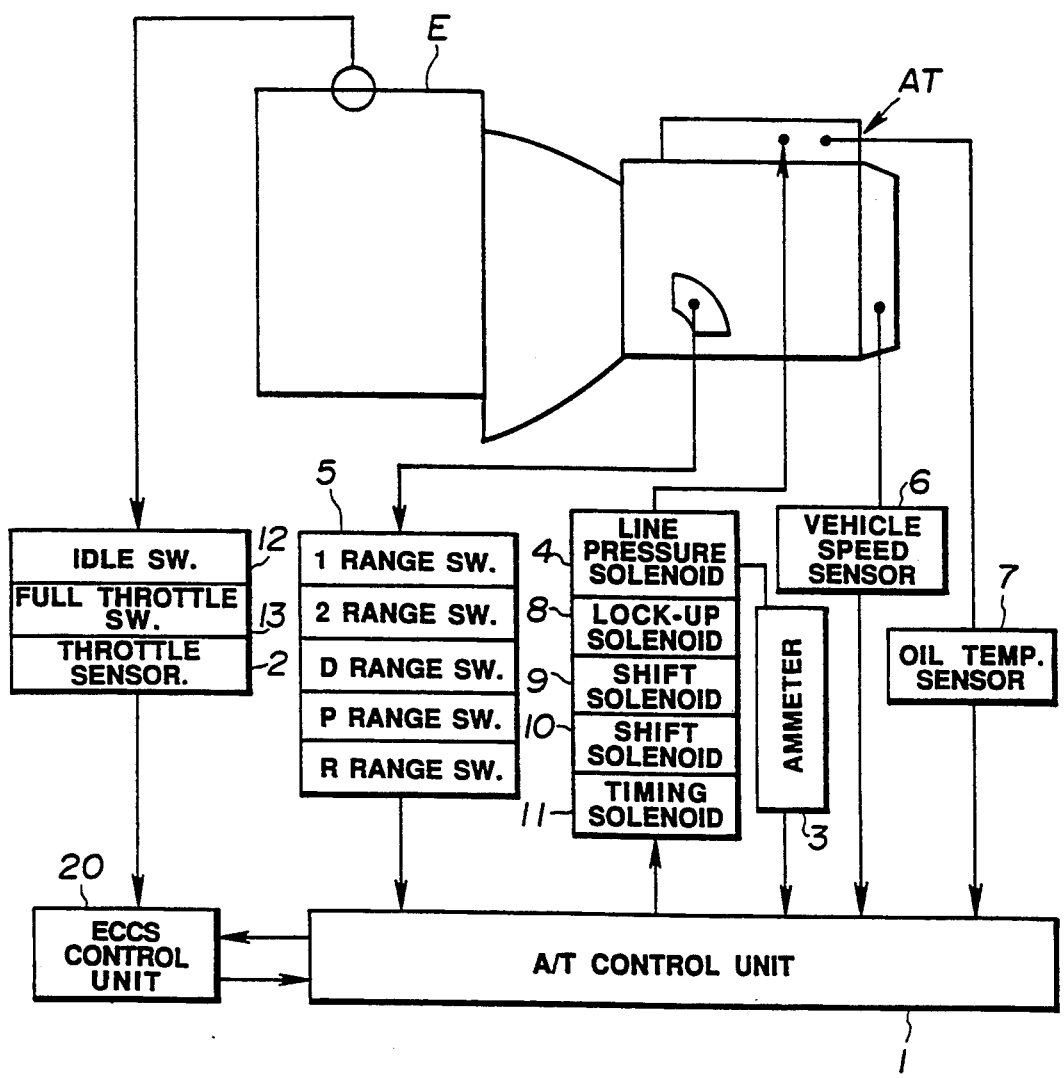
FIG. 2 is a schematic diagram of a shift control system of an automatic transmission to which an embodiment of a line solenoid valve control system according to the present invention is applied.
Figure 3:
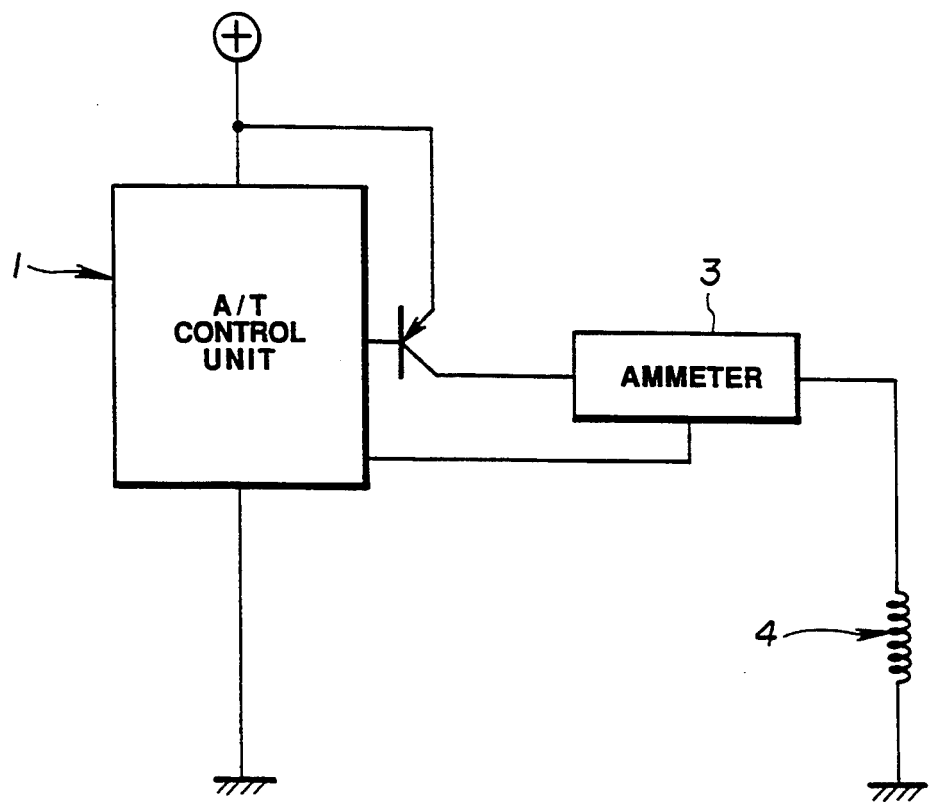
FIG. 3 is a block diagram of the embodiment of the line pressure solenoid valve control system according to the present invention.
Figure 4:
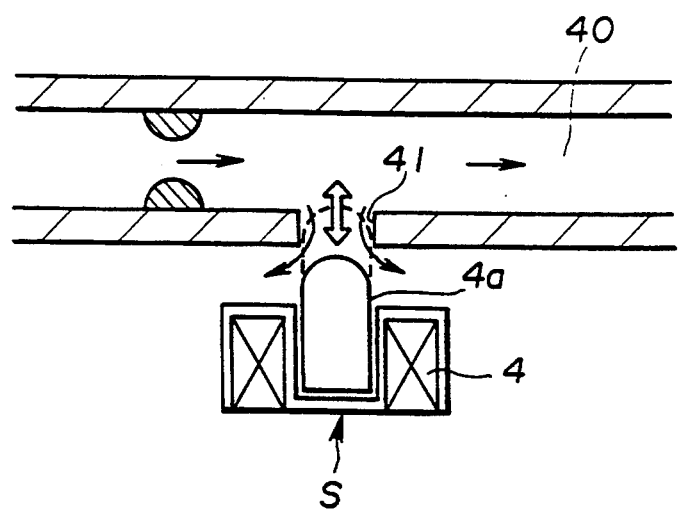
FIG. 4 is an explanatory view for showing a solenoid valve controlled by the solenoid valve control system according to the present invention.

Referring to FIGS. 2, 3 and 4, there is shown an embodiment of a solenoid valve control system according to the present invention.

The solenoid valve control system is applied to A/T control unit 1 for an automatic transmission AT. The A/T control unit 1 is connected to inhibitor switches 5, a vehicle speed sensor 6, an oil temperature sensor 7 and an ammeter 3, and receives signals therefrom. The A/T control unit 1 is further connected to a throttle sensor 2, an idle switch 12 and a full-throttle switch 13 through ECCS (that is, Electronic Concentrated Engine Control System) control unit 20 for controlling an engine E, and receives signals therefrom. The A/T control unit 1 controls the shift of the automatic transmission AT in a manner to control a line pressure solenoid 4, a lock-up solenoid 8, shift solenoids 9 and 10, and a timing solenoid 11 according to the signals from the sensors 2, 3, 5, 6, 7, 12 and 13.

As shown in FIG. 4, the line pressure solenoid 4 constitutes a part of a line pressure solenoid valve (solenoid valve) S which is applied to a line pressure circuit 40 in order to control a hydraulic pressure for controlling the shift of the automatic transmission AT. The solenoid valve S has a valve body 4a which is applied to a drain hole 41 serving as a valve seat formed in the line pressure circuit 40. When the solenoid 4 is turned on, the valve body 4a moves to a closed position. When the solenoid 4 is turned off, the valve body 4a moves to an opened position due to a biasing force of a return spring (though not shown). Practically, the solenoid 4 is operated to be repeatingly turned on and off by the pulsed electric force applied thereto in order to adjust a line pressure at a predetermined value. The line pressure is changed in a manner to change an ON-OFF ratio (duty ratio) which is of a ratio between an opening time period and a closing time period of the solenoid valve 4. That is to say, the A/T control unit 1 is arranged to change the line pressure by controlling the duty ratio of the ON-OFF signal applied to the solenoid 4.

The manner of operation of the thus arranged solenoid valve control system will be discussed hereinafter with reference to a flow charts of FIG. 5a and 5b.

The A/T control unit 1 carries out the correcting control of the line pressure upon carrying out the basic control of the line pressure.

Figure 5A:
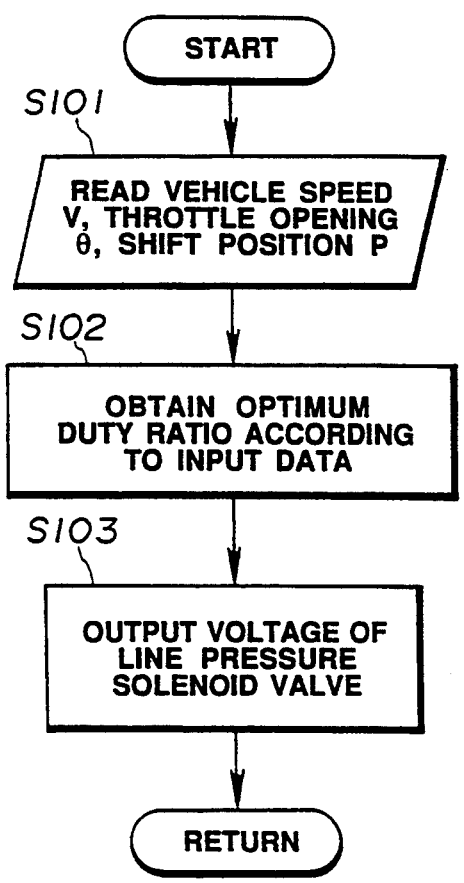
FIG. 5(a) is a flow chart showing an operation of a basic control.

A flow chart of FIG. 5(a) shows the basic control of the line pressure by the A/T control unit 1.

In a step S101, a vehicle speed V detected the vehicle speed sensor 6, a throttle opening $\theta$ detected by the throttle sensor 2 and a shift position P detected by the inhibitor switch 5 are read on by the A/T control unit 1.

In a step S102, a duty ratio for providing an optimum line pressure is obtained from a map according to the detected signals read on in the step S101.

In a step S103, a voltage corresponding to the duty ratio obtained in the step S102 is applied to the solenoid 4, as shown in FIG. 6.

These steps are repeated for controlling the line pressure according to the vehicle speed V, the throttle opening $\theta$ and the shift position P, and corresponds to a duty controlling section shown 1005 in FIG. 1.

Figure 5B:
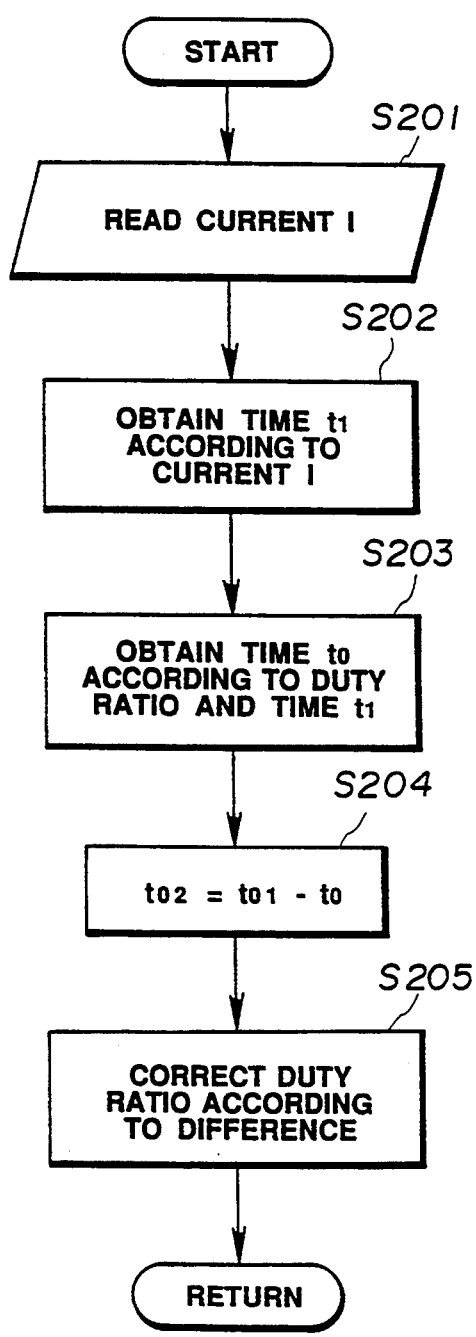
FIG. 5(b) is a flow chart showing an operation of a correcting control.

FIG. 5(b) shows a flow chart of the correcting control of the line pressure by the A/T control unit 1.

In a step S201, a current value S detected by the ammeter 3 is read on.

In a step S202, during a pulse of the outputted voltage to the solenoid 4, the A/T control unit 1 obtains a time period $t_1$ from a start of a pulse to a moment when a rate of change of the current is temporally changed from plus to minus as shown in FIG. 6b by reference character C, according to the current value I obtained in the step S201. That is to say, the time period $t_1$ corresponds to a time period (valve moving time) necessary for the valve body 4a to move from an open condition to the closed condition.

In a step S203, a time period $t_0$ which is obtained by subtracting the valve moving time $t_1$ from the pulse outputting time t determined in the step S102. That is to say, the time period $t_0$ corresponds to a time period (real valve closing time) necessary for the valve body 4a to be actually closed by one pulse of the output voltage.

In a step S204, the valve closing time $t_{01}$ on the basis of the duty ratio determined in the step S102 and the actual valve closing time $t_0$ are compared with each other, and the difference $t_{02}$ between the times $t_{01}$ and $t_0$ is obtained.

In a step S205, the duty ratio outputted at the step S103 is corrected in a manner that the width of one pulse is changed in order to adjust the actual practical valve closing time $t_0$ to the ideal valve closing time $t_{01}$.

As shown in FIGS. 6(b) and 6(c), if the actual valve closing time $t_0$ is shorter than the ideal valve closing time $t_{01}$, the duty ratio is increased such that the one pulse of the outputted voltage has a time width, that is, the difference $t_{02}$ is added to the output time t.

These steps S201 to S205 corresponds to the correcting section in the A/T control unit 1.

The current value I is represented as follows:

$$I = (E/R)(1 - e^{-(R/L)t})$$

wherein I is the current value, E is the solenoid voltage, R is the solenoid D.C. resistance, t is the on time of duty ratio, and L is the self inductance of solenoid.

The valve moving time $t_1$ is represented by a function of the voltage E and direct current resistance R when other electrical condition is constant.

$$t_1 = f(E, R)$$

When the ON time t per one pulse of the applied electric power is constant, the valve moving time $t_1$ is directly proportional to the resistance R. That is to say, the larger the resistance R becomes, the longer the moving time $t_1$ becomes. Accordingly, the smaller the resistance R becomes, the shorter the moving time $t_1$ becomes.

With the thus arranged solenoid valve control system, in case that a predetermined voltage waves as shown in FIG. 6a are outputted to the solenoid 4 according to the basic control, even if the current value takes a current wave as shown in FIG. 6b different from an ideal current wave shown in FIG. 6c, due to the dispersion of the resistance value by each resistance, deviation of the resistance value by the temperature property and the like, the voltage wave of FIG. 6a is corrected into a corrected wave shown in FIG. 6d in a manner that the difference $t_{02}$ between ideal and real valve moving time periods is obtained by the steps S202 to S204 of FIG. 5a and the ON-time of the voltage wave is increased by the difference $t_{02}$. Accordingly, even if the valve moving time $t_1$ becomes different from the previously determined ideal time, the valve closing time is kept at constant by the correcting control. Therefore, the line pressure is kept at a precise value.

Although the present invention has been shown and described according to the drawings of the preferred embodiment such that the correcting control is carried out by corrected duty ratio, it will be understood that the invention is not limited to the embodiment and may be arranged to correct the frequency of the duty ratio or to vary the voltage in order to change the moving speed of the valve.

Furthermore, while the preferred embodiment of the present invention has been shown and described to be applied to the control of the line pressure solenoid in the automatic transmission, it will be understood that this invention may be applied to the control of various solenoid valves without being limited to the above mentioned embodiment.

What is claimed is:

1. A solenoid valve control system, comprising:

a solenoid changing a solenoid valve state between an opened state and a closed state by applying an electric power having a predetermined voltage value and a pulsed electric current thereto;

means for detecting a value of the pulsed electric current applied to said solenoid; and means for controlling the pulsed electric power applied to said solenoid, said controlling means including:

a duty control section controlling an ON-OFF ratio of the pulsed electric power repeatingly applied to said solenoid, and a correcting section which corrects an output from the duty control section according to the current value detected by said detecting means, the correcting section detecting a time period from a start of the pulsed electric current of the electric power to a first moment when a rate of the change of the current is temporally changed from plus to minus, and correcting the ON-OFF ratio of the predetermined pulsed electric power such that the time period from the first moment to a second moment of an end of the pulsed electric current is kept at a predetermined value.

2. A solenoid valve control system as claimed in claim 1, wherein the time period between the first and second period is kept at the predetermined value by adding a difference between the time period from a start to the first moment of a detected current curve and that of an ideal current curve.

3. A line pressure control system in use for a line pressure control circuit of an automatic transmission, said line pressure control system comprising:

a solenoid valve having a solenoid and a valve body, the solenoid changing a position of the valve body into one of opening or closing states according to an electrical switching of the solenoid, an ammeter detecting a value of a current applied to the solenoid;

a controlling device controlling a pulsed electric power applied to the solenoid, said controlling device including:

a duty control section controlling an ON-OFF ratio of said pulsed electric power repeatingly applied to said solenoid, and a correcting section correcting an output from the duty control section according to the current value detected by the ammeter, the correcting section detecting a time period from a start of pulsed electric current of the electric power to a first moment when a rate of the change of the current is temporally changed from plus to minus, and correcting the ON-OFF ratio of the pulsed electric power such that the time period from the first moment to a second moment of an end of the pulsed electric current is kept at a predetermined value.

4. A solenoid valve control system controlling a solenoid which changes a solenoid valve state between an opened state and a closed state by applying a pulsed electric power thereto, said solenoid system comprising:

means for detecting a value of a current applied to said solenoid; and means for controlling said pulsed electric power applied to said solenoid, said controlling means including:

a duty control section controlling an ON-OFF ratio of said pulsed electric power repeatingly applied to said solenoid, and a correcting section which corrects an output from the duty control section according to the current value detected by said detecting means, the correcting section detecting a time period from a start of a pulsed electric current of the electric power to a first moment when a rate of the change of the current is temporally changed from plus to minus, and correcting the ON-OFF ratio of the predetermined pulsed electric power such that the time period from the first moment to a second moment of an end of the pulsed electric current is kept at a predetermined value.

* * * * *